US010913492B2

(12) United States Patent
Kilz et al.

(10) Patent No.: US 10,913,492 B2
(45) Date of Patent: Feb. 9, 2021

(54) STEER-BY-WIRE STEERING AND STEERING ANGLE ADJUSTMENT METHOD FOR STEER-BY-WIRE STEERING

(71) Applicant: VOLKSWAGEN AG, Wolfsburg (DE)

(72) Inventors: Sebastian Kilz, Celle (DE); Björn Makkus, Braunschweig (DE); Johannes Maria Schäfer, Werben OT Berge (DE)

(73) Assignee: VOLKSWAGEN AG ( * ) Notice: Subject to any disclaimer, the term of this patent is extended or adjusted under 35 U.S.C. 154(b) by 350 days.

(21) Appl. No.: 15/952,273

(22) Filed: Apr. 13, 2018

(65) Prior Publication Data
US 2018/0304923 A1 Oct. 25, 2018

(30) Foreign Application Priority Data

Apr. 19, 2017 (DE) .................. 10 2017 206 610

(51) Int. Cl.
B62D 6/00 (2006.01)
B62D 5/00 (2006.01)
B62D 6/10 (2006.01)

(52) U.S. Cl.
CPC ............. *B62D 6/008* (2013.01); *B62D 5/001* (2013.01); *B62D 5/006* (2013.01); *B62D 6/002* (2013.01); *B62D 6/10* (2013.01)

(58) Field of Classification Search
USPC ......................................................... 701/41
See application file for complete search history.

(56) References Cited

U.S. PATENT DOCUMENTS 6,481,526 B1 * 11/2002 Millsap .................. B62D 5/006
180/402
2007/0180945 A1 * 8/2007 Tomaru .................. B62D 1/181
74/493

(Continued)

FOREIGN PATENT DOCUMENTS

DE         10221721 A1   11/2003
DE         10305132 A1   11/2004
DE      102005015816 A1   10/2005

(Continued)

OTHER PUBLICATIONS

Search Report for German Patent Application No. 10 2017 206 610.5, dated Jan. 8, 2018.

*Primary Examiner* — Tyler D Paige
(74) *Attorney, Agent, or Firm* — Barnes & Thornburg LLP

(57) ABSTRACT

A steer-by-wire steering system having a steering control, a rotation angle sensor for detecting a position of the steering control, an actuator for producing a counter-torque on the steering control, a steering actuator for adjusting a steering angle depending on the data of the rotation angle sensor on a final control element, wherein the final control element has a mechanical end stop and the actuator implements a software end stop on the steering control, wherein a transmission ratio is set between the rotation angle on the steering control and the steering angle, wherein a positive delta value and a negative delta value are defined for the set transmission ratio, wherein the steer-by-wire steering system is embodied so the adjusted transmission ratio is selected so that a remaining position error of the steering control is minimized.

13 Claims, 2 Drawing Sheets

(56) References Cited

U.S. PATENT DOCUMENTS

2008/0156572 A1\* 7/2008 Kasahara .............. F16D 41/088
                                                                    180/402
2018/0304923 A1\* 10/2018 Kilz ........................ B62D 6/10

FOREIGN PATENT DOCUMENTS

| EP | 1407959 | A2 | 4/2004 |
| EP | 1426267 | A2 | 6/2004 |
| EP | 1621448 | A2 | 2/2006 |

\* cited by examiner

STEER-BY-WIRE STEERING AND STEERING ANGLE ADJUSTMENT METHOD FOR STEER-BY-WIRE STEERING

PRIORITY CLAIM

This patent application claims priority to German Patent Application No. 10 2017 206 610.5, filed 19 Apr. 2017, the disclosure of which is incorporated herein by reference in its entirety.

SUMMARY

Illustrative embodiments relate to a steer-by-wire steering system and a method for adjusting a steering angle in a steer-by-wire steering system.

BRIEF DESCRIPTION OF THE DRAWINGS

The disclosed embodiments are described in detail below with reference to the figures, in which.

DETAILED DESCRIPTION

Figure 1:
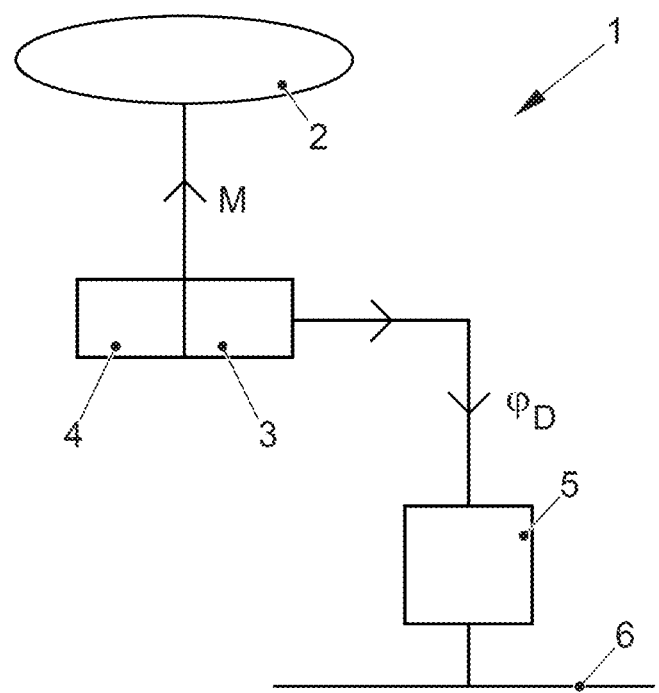
FIG. 1 shows a schematic block diagram of a steer-by-wire steering system.

Steer-by-wire steering systems usually comprise a steering control, a rotation angle sensor for detecting a position of the steering control, a steering actuator for adjusting a steering angle depending on the data of the rotation angle sensor on a final control element and the final control element. The actuator and the steering actuator are typically embodied as electric motors. The steering control is, for example, a steering wheel and the final control element is a rack. In this case, the final control element comprises a mechanical end stop. The actuator produces a software full deflection on the steering control by generating a counter-torque, beyond which the driver typically cannot steer.

Further, a transmission ratio is set between the rotation angle of the steering control and the steering angle, wherein the transmission ratio can be dependent on parameters such as, for example, the speed of the transportation vehicle or a driver assistance system (for example, a parking aid). In this case, the position of the software full deflection may correspond to the position of the mechanical end stop.

For various reasons, it can occur that the driver steers beyond the software full deflection, for example, he applies a suitably large manual torque or even because the actuator cannot produce any or a sufficiently large counter-torque. The result of this is that the position of the rotation angle sensor no longer corresponds to the position of the final control element. In the extreme case, this can be one or more revolutions of the steering wheel. In this situation, the question arises as to how the steer-by-wire steering system should react if it is steered back in the opposite direction (i.e., towards a neutral position). Theoretically, it would be conceivable that the steering only reacts on reaching the rotation angle associated with the software end stop and from there the final control signals are then implemented by the steering actuator with the set transmission ratio. However, this would then result in the driver possibly carrying out full steering wheel revolutions without the steering system responding.

To solve the problem, EP 1 426 267 A2 provides that the transmission ratio is adjusted. In this case, the transmission ratio is reduced, and indeed so that a neutral position of the steering wheel again corresponds to a neutral position (straight-ahead position) of the steering system.

The disclosed embodiments provide a steer-by-wire steering system, in which the feel of the steering is improved in cases of over-rotating the steering control beyond a software end stop position. A further technical problem is the provision of a method for adjusting a steering angle in a steer-by-wire steering system in such a situation.

Disclosed embodiments provide a steer-by-wire steering system and a method for adjusting the steer-by-wire steering system.

For this purpose, the steer-by-wire steering system comprises a steering control, a rotation angle sensor for detecting a position of the steering control, an actuator for producing a counter-torque on the steering control, a steering actuator for adjusting a steering angle depending on the data of the rotation angle sensor on a final control element and the final control element. In this case, the final control element comprises a mechanical end stop and the actuator implements a software end stop on the steering control, wherein a transmission ratio is set between the rotation angle on the steering control and the steering angle. A positive delta value and a negative delta value are defined for the set transmission ratio. In this case, the steer-by-wire steering system is embodied so that in the event of over-rotating the steering control beyond the rotation angle associated with the software end stop during a reversal of direction of the rotation angle, a transmission ratio is set that is limited by the positive delta value and the negative delta value, wherein the transmission ratio is selected so that a remaining position error of the steering control is minimized. It is not the primary aim that the neutral position of the steering control and the neutral or straight-ahead position of the steering system are brought into coincidence, but that the driver is provided with a customary and expected transmission ratio of the steering system, wherein any remaining position error of the steering control is accepted. In this case, the delta values are selected so that the driver does not perceive the deviations from the transmission ratio or perceives them as not unpleasant. For example, the delta values can be determined in advance during driving trials with a sufficiently large group of test persons. The steering system thus responds immediately with the usual transmission ratio in the event of a reversal of direction.

In at least one disclosed embodiment, the positive delta value and/or the negative delta value is/are zero. In the extreme case, if both delta values are zero, in the event of a reversal of direction the set transmission ratio is thus used and a position error is accepted.

In a further disclosed embodiment, the positive delta value and the negative delta value are of equal magnitude, whereby the position errors can be symmetrically compensated.

However, the delta values can also be of different magnitudes, for example, since the perceptibility of increased and reduced transmission ratios is different.

In a further disclosed embodiment, integral multiples of 360° or of another angle of symmetry of the steering control within a rotation angle that is steered beyond the rotation angle associated with the software end stop are ignored. In this way, the adjustment of the transmission ratio to be corrected is minimized. Thus, if, for example, the over-rotation is 370° beyond the software end stop, then only the 10° are corrected (correspondingly, at 730° only 10° are also corrected). If the steering control is half symmetrical (for example, the steering control comprises only one cross-spoke, the horizontal position of which corresponds to the neutral position), then the angle of symmetry is 180°.

To now correct any remaining position error, it can be provided that the method is repeated for the next steering lock, wherein the adjustment of the transmission ratio can be carried out in the forward direction and/or in the event of a reversal of direction.

In FIG. 1, a steer-by-wire steering system 1 is represented schematically, comprising a steering control 2, a rotation angle sensor 3 for detecting a position φD of the steering control 2, an actuator 4 for producing a counter-torque M on the steering control 2, and a steering actuator 5 for adjusting a steering angle φL depending on the data φD of the rotation angle sensor 3 on a final control element 6. The steering actuator 5 is, for example, an electric motor with a control unit with a data communications connection to the rotation angle sensor 3. In the control unit, a transmission ratio Ü between the rotation angle φD and the steering angle φL is stored. A positive delta value pD and a negative delta value −nD for the transmission ratio Ü are also stored in the control unit, which is described in detail below. The final control element 6 is, for example, a rack, which is coupled to a shaft of the electric motor by a ball head gear, for example. The control unit 6 sets the steering angle φL on steerable transportation vehicle wheels that are not represented. In this case, the final control element 6 comprises a mechanical end stop, at which a maximum steering angle ±φL,MAX can be set depending on the steering direction (see also FIG. 3).

Figure 2:
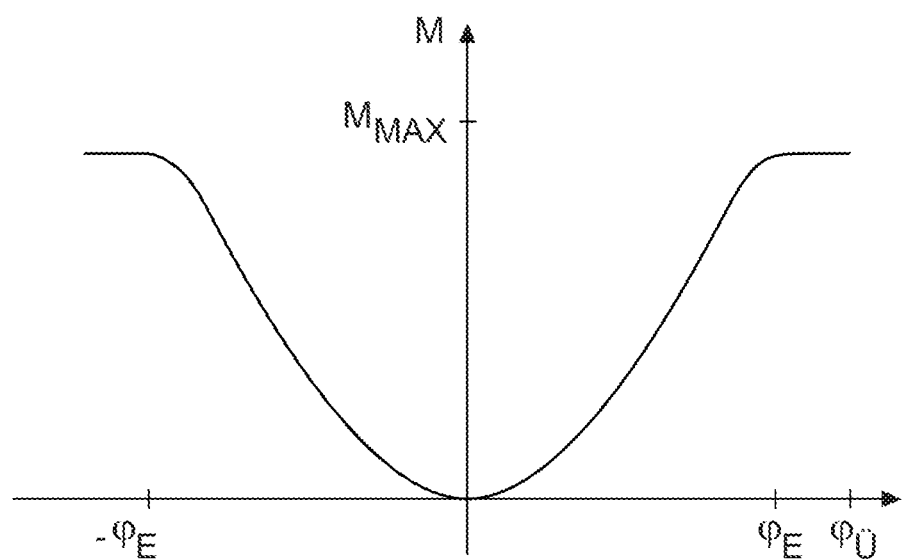
FIG. 2 shows a schematic profile of a counter-torque on the steering control against the rotation angle.

In FIG. 2, the counter-torque M produced by the actuator 4 is shown against the rotation angle φD, wherein for a rotation angle ±φE, a maximum counter-torque MMAX is produced to implement a software end stop.

Figure 3:
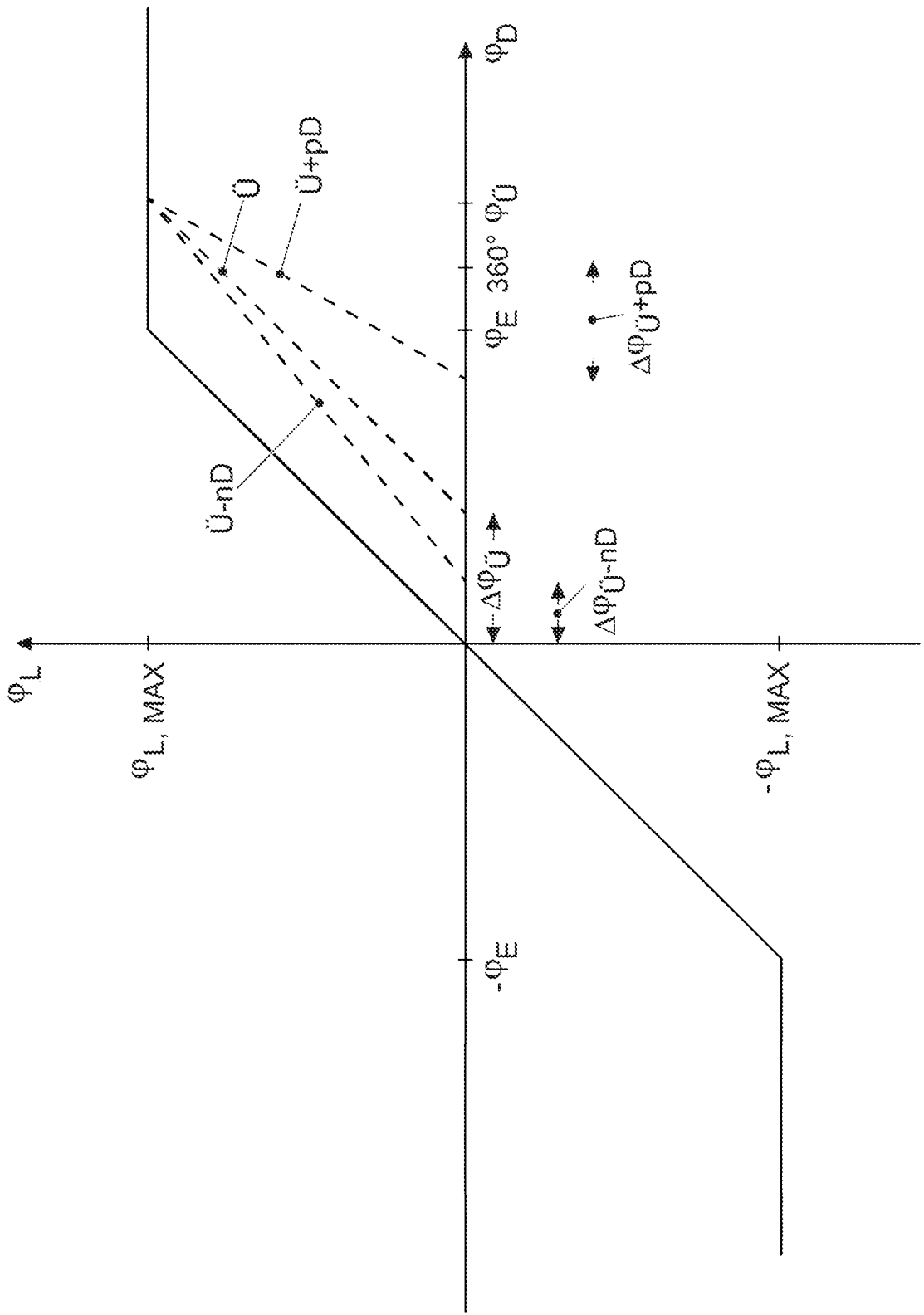
FIG. 3 shows a schematic profile of the steering angle against the rotation angle.

In FIG. 3, finally the steering angle φL is shown against the rotation angle φD, wherein the gradient of the transmission ratio Ü is shown. If a failure of or a fault in the actuator 4 now occurs, so that the actuator 4 cannot produce a counter-torque M, then the driver can turn the steering control 2 without resistance and, for example, can set a rotation angle φÜ. In this case, the steering angle φL follows during the rotation until φD=φE is reached (mechanical end stop of the final control element), wherein further changes in the rotation angle to φÜ have no further influence on the steering angle φL. If the driver then turns the steering control 2 back again, the steering immediately responds, i.e., the steering actuator 5 controls the final control element 6, wherein the transmission ratio Ü can be selected in the range Ü−nD to Ü+pD, wherein a position error Δφ may remain (see FIG. 3). In this case, Δφ is shown in FIG. 3 when the reversal of direction is carried out with the transmission ratio Ü.

To describe the method, a pair of assumptions will now be made. For this −nD=pD. Further, it will be assumed that the steering control 2 is embodied in such a way that a certain position is visually associated with the neutral position. If, for example, the steering control 2 comprises a spoke with a manufacturer's logo, then visually the horizontal logo is the neutral position. The rotation angle φÜ or the difference φÜ−φE can be of any arbitrary size and may be greater than 360°. If the difference is 360° and the steering control is turned back with the same transmission ratio Ü, then a Δφ of 360° is set, which the driver cannot detect visually however. The perceptible position error of the steering control 2 is thus zero. Therefore, deviations of integral multiples of 360° can be disregarded.

The perceptible position error of the steering control 2 can thus only lie in the range >0 and <360°. By increasing the transmission ratio Ü+pD, a smaller rotation angle φ is required for the same steering angle φL, and by reducing the transmission ratio Ü−nD a larger rotation angle φ is required for the same steering angle φL. Further, it will be assumed that the remaining position error or steering control can be both positive and also negative, i.e., in the neutral position of the steering system (straight-ahead travel, φL=0), the steering control is turned to the left or right. Further, it will be assumed, for example, that compensation can be carried out by −nD+100° rotation angle and with pD −100° rotation angle. Because of the assumed symmetry, the worst case is at Δφ=180°.

With the assumed numerical values, Δφ values between >0 and 100° can be fully compensated by an adjusted transmission ratio between Ü and Ü−nD. Likewise, Δφ values between <360° and 260° can be compensated by an adjusted transmission ratio Ü+pD, wherein a position error remains for Δφ between 100° and 260°.

This can be explained graphically as follows. If Δφ with the transmission ratio Ü is less than 180°, then a shallower straight line is selected, so that the intersection of the x-axis is shifted towards the coordinate origin. If on the other hand Δφ is greater than 180°, then a steeper straight line is selected, so that the intersection with the x-axis is shifted towards φD=360°. The visually perceptible position error is thus reduced, wherein the steering behavior is not changed in a disturbing manner.

The invention claimed is:

1. A steer-by-wire steering system, comprising:
a steering control defining an angle of symmetry;
a rotation angle sensor for detecting a position of the steering control;
an actuator for producing a counter-torque on the steering control; and
a steering actuator for adjusting a steering angle depending on the data of the rotation angle sensor on a final control element, the steering angle defining a centered steering angle of zero degrees that corresponds with the angle of symmetry of the steering control,
wherein the final control element comprises a mechanical end stop corresponding to a maximum steering angle and the actuator implements a software end stop on the steering control based on the mechanical end stop,
wherein a transmission ratio is set, the transmission ratio defined by a ratio between the rotation angle on the steering control and the steering angle and including a starting transmission ratio,
wherein, in response to over-rotation of the steering control beyond the rotation angle associated with the software end stop to an over-rotated rotation angle, and in response to a subsequent reversal of direction of the steering control resulting in a reversal of direction of the rotation angle and the steering angle, increasing the transmission ratio to an increased transmission ratio or decreasing the transmission ratio to a decreased transmission ratio such that, when the steering angle reaches the centered steering angle, a difference between the rotation angle and the centered steering angle is minimized.

2. The steer-by-wire steering system of claim 1, wherein a positive delta value is defined by a difference between the starting transmission ratio and the increased transmission ratio, and the negative delta value defined by a difference between the starting transmission ratio and the decreased transmission ratio.

3. The steer-by-wire steering system of claim 2, wherein the positive delta value and the negative delta value are of equal magnitude.

4. The steer-by-wire steering system of claim 2, wherein the positive delta value and the negative delta value are of different magnitudes.

5. The steer-by-wire steering system of claim 2, wherein the positive delta value and/or the negative delta value is/are zero.

6. The steer-by-wire steering system of claim 1, wherein the system ignores integral multiples of 360° and integral multiples of the angle of symmetry of the steering control that lie within the over-rotated rotation angle and the centered steering angle.

7. The steer-by-wire steering system of claim 1, wherein:
a rate of change of the steering angle is equal to a rate of change of the steering control in response to the transmission ratio being set to the starting transmission ratio;
the rate of change of the steering angle is greater than the rate of change of the steering control in response to the transmission ratio being adjusted to the increased transmission ratio; and
the rate of change of the steering angle is less than the rate of change of the steering control in response to the transmission ratio being adjusted to the decreased transmission ratio.

8. A method for adjusting a steering angle in a steer-by-wire steering system, wherein the steer-by-wire steering system comprises a steering control, a rotation angle sensor for detecting a position of the steering control defining an angle of symmetry, an actuator for producing a counter-torque on the steering control, a steering actuator including a control unit having a data communications connection to the rotation angle sensor and configured to adjust a steering angle depending on the data of the rotation angle sensor on a final control element and the final control element, the steering angle defining a centered steering angle of zero degrees that corresponds with the angle of symmetry of the steering control, wherein the final control element comprises a mechanical end stop corresponding to a maximum steering angle and the actuator implements a software end stop on the steering control based on the mechanical end stop, the method comprising:
setting a transmission ratio via the control unit, the transmission ratio defined by a ratio between the rotation angle on the steering control and the steering angle and including a starting transmission ratio;
in response to over-rotation of the steering control beyond the rotation angle associated with the software end stop to an over-rotated rotation angle, and in response to a subsequent reversal of direction of the steering control resulting in a reversal of direction of rotation angle and the steering angle, increasing the transmission ratio to an increased transmission ratio or decreasing the transmission ratio to a decreased transmission ratio such that, when the steering angle reaches the centered steering angle, a difference between the rotation angle and the centered steering angle is minimized.

9. The method of claim 8, wherein, in response to a renewed steering lock and subsequent reversal of direction, the transmission ratio in at least one direction is adjusted so that the position error is further minimized.

10. The method of claim 9, wherein the positive delta value and the negative delta value are selected to be of equal or different magnitudes.

11. The method of claim 8, wherein a positive delta value is defined by a difference between the starting transmission ratio and the increased transmission ratio, and the negative delta value defined by a difference between the starting transmission ratio and the decreased transmission ratio.

12. The method of claim 11, wherein the positive delta value and/or the negative delta value is/are selected as zero.

13. The method of claim 8, wherein integral multiples of 360° and integral multiples of the angle of symmetry of the steering control that lie within the over-rotated rotation angle and the centered steering angle.

* * * * *